United States Patent [19]

Sekiguchi

[11] 3,969,591

[45] July 13, 1976

[54] CIRCUIT FOR PREVENTING IMPULSE GENERATION BY OPERATING A HOOK SWITCH IN A TELEPHONE SET

[75] Inventor: Kouichi Sekiguchi, Asaka, Japan

[73] Assignee: Iwasaki Tsushinki Kabushiki Kaisha, Japan

[22] Filed: Dec. 18, 1974

[21] Appl. No.: 533,801

[30] Foreign Application Priority Data
Dec. 28, 1973   Japan.................................. 48-1490

[52] U.S. Cl............................ 179/84 R; 179/81 R;
[51] Int. Cl.²........................................... H04M 1/74
[58] Field of Search ........... 179/18 HB, 84 R, 84 A, 179/18 F, 18 FA, 81 R, 81 E, 159

[56] References Cited
UNITED STATES PATENTS 3,471,650   10/1969   Birck ............................... 179/84 A
3,525,819   8/1970   Jackson............................. 179/84 R

*Primary Examiner*—Thomas A. Robinson
*Attorney, Agent, or Firm*—Robert E. Burns; Emmanuel J. Lobato; Bruce L. Adams

[57] ABSTRACT

A circuit for preventing impulse generation caused by operating a hook switch in a telephone set, in which the hook switch has a make contact and a break contact which are make-before-break contacts in going to the OFF-hook condition, and are break-after-make contacts in going to the ON-hook condition. A capacitor is charged through the make contact when it is closed in the OFF-hook condition. A transistor switching circuit is provided to turn ON by the charge on the capacitor so as to short-circuit between telephone line terminals of the telephone set when the break contact is closed in the ON-hook condition.

3 Claims, 1 Drawing Figure

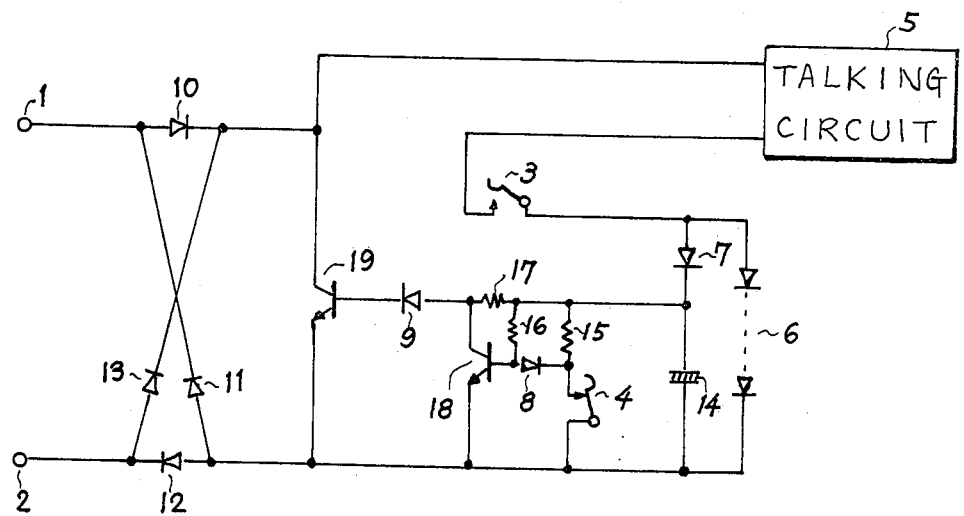

CIRCUIT FOR PREVENTING IMPULSE GENERATION BY OPERATING A HOOK SWITCH IN A TELEPHONE SET

This invention relates to a circuit for preventing the generation of impulses by operating a hook switch in a telephone set.

In conventional hook switch devices of the known type, the operation of a hook switch is delayed by mechanical constructions or by using a slow releasing relay to prevent the impulse generation. Therefore, there are such disadvantages as the requirement for some complicated mechanism in the hook switch, lowering of talking performance caused by insertion of the relay, or increasing of the weight of the hook switch device.

An object of this invention is to provide a device wherein the generation of impulses caused by on-off operation of a hook switch in a telephone set is prevented in cooperation with hook switch contacts and a transistor switching circuit.

This invention will be described with reference to the accompanying drawing. The single FIGURE illustrates the circuit diagram of a preferred embodiment of this invention.

Referring now to the drawing, reference numerals 1 and 2 show telephone line terminals; reference numeral 3 represents a make contact of a hook switch; a numeral 4 a break contact of the hook switch; and a reference numeral 5 a talking circuit. Each of reference numerals 6 through 13 identifies a diode; a numeral 14 a capacitor; and each of the numerals 15 through 17 identifies a resistor. Reference numerals 18 and 19 respectively show transistors. A dial and a bell are also provided in an ordinary telephone set, but they are omitted in the drawing since they have no relation with this invention.

The contacts of the hook switch are constructed to operate as follows:

The break contact 4 of the hook switch is opened after the make contact 3 has been closed in going OFF-hook, and the break contact 4 is closed before the make contact 3 is opened in going ON-hooked. Accordingly, the contacts 3 and 4 are make-before-break contacts in going OFF-hook, and are also break-after-make contacts in going ON-hook.

When a handset is OFF-hooked to close the make contact 3, a direct current circuit is completed through a path defined by: the telephone line terminal 1 — the diode 10 — the talking circuit 5 — the make contact 3 — the diode 6 — the diode 12 — the telephone line terminal 2. At the same time, the capacitor 14 is charged through the diode 7 by a voltage appearing across the diode 6.

In the aforementioned circuit condition, the break contact 4 is opened so that the voltage across the capacitor 14 causes a current to flow into the base of the transistor 18 through a series combination of the resistor 15 and the diode 8 or through the resistor 16, so that the collector - emitter path of the transistor 18 is turned - ON while the collector - emitter path of the transistor 19 is turned - OFF. Therefore, the transistor 19 does not cause any disturbance in normal talking operations of the telephone set.

The operation of the circuit according to this invention when the hook switch is operated between ON and OFF conditions to transmit dial impulses will now be described.

In this invention, the capacity of the capacitor 14 is chosen so as to keep the necessary voltage across its terminals even if the make contact 3 of the hook switch is opened in a short period of time, for example 100 milliseconds. As mentioned above, the transistor 19 is turned OFF when the handset is OFF-hooked. However, the break contact 4 is closed when the hook switch is ON-hooked, and the transistor 18 is turned OFF since the base current of the transistor 18 passing through the resistor 16 flows now through the diode 8 and the closed break contact 4. A base current of the transistor 19 flows through the resistor 17 and the diode 9 to turn ON the transistor 19. The ON-state of the transistor 19 continues during a short time while the voltage across the capacitor 14 maintains a sufficient value. Therefore, the DC loop across the telephone line terminals 1 and 2 is completed during the short time through a path defined by the telephone line terminal 1 — the diode 10 — the transistor 19 — the diode 12 — the telephone line terminal 2, even if the make contact 3 is opened after the break contact 4 has been closed. If the capacity of the capacitor 14 is determined so that the voltage across the capacitor 14 is maintained during a time (for example, longer than 100 mS) greater than the pulse width of the dial impulse, the generation of impulses caused by operation of the hook switch between ON and OFF conditions can be prevented.

Whenever the hook switch is turned ON and OFF, the operations described above are repeated so that the impulses can not be transmitted.

As described in detail above, the transistor 19 is turned ON in the circuit of this invention, at a time when the hook switch is ON-hooked (the break contact 4 is closed), but the transistor 19 assumes its OFF state or its high impedance state in response to the bell signals at the talking period and the called time. Accordingly, the transistor 19 has no substantial effect on them.

In accordance with this invention wherein the transistor switching circuit is used, the generation of the impulses by the operation of the hook switch is prevented by simple constructions without a complicated mechanism of the hook switch and lowering of the talking performance.

What I claim is:

1. In a telephone set, a circuit for preventing impulse generation by the operation of a telephone hook switch, comprising:

the hook switch having a make contact and a break contact which are make-before-break contacts when going to the OFF-hook condition, and break-after-make contacts when going to the ON-hook condition;

a capacitor connected to said make contact to be charged through said make contact when said make contact is closed in the OFF-hook condition, and to be discharged through said break contact when said break contact is closed in the ON-hook condition; and a transistor switching circuit connected to said break contact and said capacitor and turned ON by the charge on the capacitor to develop short-circuit between telephone line terminals of the telephone set when the break contact is closed.

2. In a telephone set having a circuit for preventing impulse generation according to claim 1, said circuit including a first diode provided between said capacitor and said make contact, and a series connection of second diodes connected in parallel with the series connection of said first diode and of said capacitor.

3. In a telephone set having a circuit for preventing impulse generation according to claim 1, in which said transistor switching circuit comprises a first transistor having an emitter-collector path connected across said telephone line terminals through a diode bridge, a second transistor having an emitter-collector path connected across the base-emitter path of said first transistor through a third diode, and a fourth diode connected between the base of said second transistor and said capacitor, said break contact being connected across the base-emitter path of said second transistor through said fourth diode.

* * * * *